United States Patent
Brooks et al.

(10) Patent No.: US 9,088,145 B2
(45) Date of Patent: Jul. 21, 2015

(54) ILLUMINATED ATTACHMENT FOR ROUTING CABLES

(75) Inventors: Matthew E. Brooks, Tucson, AZ (US); David F. DeHaan, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 12/777,258

(22) Filed: May 11, 2010

(65) Prior Publication Data
US 2011/0279064 A1    Nov. 17, 2011

(51) Int. Cl.
| H05B 37/02 | (2006.01) |
|---|---|
| H02G 3/20 | (2006.01) |
| H02G 3/38 | (2006.01) |
| H01R 13/703 | (2006.01) |
| H01R 24/62 | (2011.01) |
| H02G 1/06 | (2006.01) |

(52) U.S. Cl.
CPC .............. H02G 3/20 (2013.01); H02G 3/385 (2013.01); H01R 13/703 (2013.01); H01R 24/62 (2013.01); H02G 1/06 (2013.01); Y10T 29/49169 (2015.01)

(58) Field of Classification Search
CPC ........... H02G 3/20; H02G 3/385; H02G 1/06; H01R 13/703; H01R 24/62; Y10T 29/49169
USPC ......... 362/95, 276; 439/490; 340/656, 815.45
See application file for complete search history.

(56) References Cited

U.S. PATENT DOCUMENTS

| | | | |
|---|---|---|---|
| 4,862,438 A * | 8/1989 | Fry ................................ 369/19 |
| 5,007,857 A * | 4/1991 | Wright .......................... 439/490 |
| 5,236,383 A * | 8/1993 | Connelly ...................... 446/219 |
| 5,704,669 A * | 1/1998 | Clark ............................ 294/209 |
| 5,820,249 A * | 10/1998 | Walsten et al. ............... 362/191 |
| 5,876,240 A | 3/1999 | Derstine et al. |
| 6,648,492 B1 * | 11/2003 | Shih .............................. 362/397 |
| 7,004,595 B1 * | 2/2006 | Stoddard ......................... 362/95 |
| 7,049,937 B1 * | 5/2006 | Zweig et al. .................. 340/657 |
| 7,378,756 B2 * | 5/2008 | Singer et al. .................... 307/64 |
| 7,563,124 B1 * | 7/2009 | Marshall et al. .............. 439/389 |
| 7,651,365 B2 * | 1/2010 | Chien ........................... 439/490 |
| 7,735,445 B2 * | 6/2010 | Monk et al. ................... 116/209 |
| 2002/0061399 A1 | 5/2002 | Chizmas et al. |
| 2003/0222786 A1 * | 12/2003 | Dannenmann et al. .. 340/815.45 |
| 2005/0089284 A1 | 4/2005 | Ma |
| 2005/0124209 A1 | 6/2005 | Currie et al. |
| 2006/0194468 A1 | 8/2006 | Griffin |
| 2007/0117450 A1 * | 5/2007 | Truxes .......................... 439/490 |
| 2008/0102689 A1 | 5/2008 | Dhir |
| 2008/0261440 A1 | 10/2008 | Buzil et al. |
| 2009/0080153 A1 * | 3/2009 | Richardson et al. ..... 361/679.56 |
| 2009/0086503 A1 | 4/2009 | Trujillo |
| 2009/0093154 A1 | 4/2009 | Shen et al. |
| 2009/0215308 A1 | 8/2009 | Wu |
| 2009/0247002 A1 * | 10/2009 | Wu et al. ....................... 439/490 |
| 2009/0257221 A1 * | 10/2009 | Patterson ...................... 362/191 |
| 2011/0026255 A1 * | 2/2011 | Kwak ............................ 362/253 |

* cited by examiner

*Primary Examiner* — Thomas M Sember

(74) *Attorney, Agent, or Firm* — Nelson and Nelson; Daniel P. Nelson; Alexis V. Nelson

(57) ABSTRACT

An apparatus for routing data and power cables under raised floors and through other structures is disclosed herein. In one embodiment, such an apparatus includes an illuminated attachment comprising a connection mechanism to removably connect the illuminated attachment to an end of a cable. The illuminated attachment adds weight to the end of the cable to aid in tossing the end from one location to another. A corresponding method is also disclosed herein.

9 Claims, 5 Drawing Sheets

ILLUMINATED ATTACHMENT FOR ROUTING CABLES

BACKGROUND

1. Field of the Invention

This invention relates to apparatus and methods for routing data and power cables under raised floors or through other structures.

2. Background of the Invention

Raised floors are used in buildings such as data centers or equipment rooms to provide means for efficiently routing cables to and from components such as servers, data storage devices, switches, routers, workstations, and the like. A raised floor may consist of a gridded metal framework or understructure supported by adjustable-height legs or pedestals. The gridded metal framework may provide support for individual floor panels (e.g., square floor panels measuring two feet or sixty centimeters on each side). The height of the legs/pedestals may be selected based on the number or volume of cables routed under the raised floor. Selected floor panels may be removed from the gridded metal framework to route cables or other wiring beneath the raised floor.

Running cables (e.g., Fibre Channel cables, Ethernet cables, power cables, etc.) under a raised floor can be difficult when trying to span long distances. The current solution is to simply remove selected floor panels and toss the cable beneath the raised floor from one open floor panel to the next. This process may be repeated until the cable is routed to a desired location. It is easy to lose track of a cable using this technique, particularly where the cable is routed in the presence of other cables, equipment, or obstacles. A lack of adequate lighting or poor viewing angles can also make it difficult to route cables under the raised floor. There is also the danger that a connector on the cable may be damaged when tossing the cable from one open floor panel to another.

In view of the foregoing, what are needed are apparatus and methods to more effectively route cables under raised floors or through other structures such as walls, ceilings, crawl spaces, conduits, or the like. Ideally, such apparatus and methods would enable an individual to more easily see the cable as it is being routed under a raised floor or other structure, particularly where the cable is routed in the presence of other cables or wiring. Further needed are apparatus and methods to protect the connector on the end of the cable when the cable is being tossed from one open floor panel to another.

SUMMARY

The invention has been developed in response to the present state of the art and, in particular, in response to the problems and needs in the art that have not yet been fully solved by currently available apparatus and methods. Accordingly, the invention has been developed to provide apparatus and methods for routing data and power cables under raised floors or though other structures. The features and advantages of the invention will become more fully apparent from the following description and appended claims, or may be learned by practice of the invention as set forth hereinafter.

Consistent with the foregoing, an apparatus for routing data and power cables under raised floors and through other structures is disclosed herein. In one embodiment, such an apparatus includes an illuminated attachment comprising a connection mechanism to removably connect the illuminated attachment to an end of a cable. The illuminated attachment adds weight to the end of the cable to aid in tossing the end from one location to another.

In another embodiment of the invention, a method for routing data and power cables under raised floors and through other structures is disclosed herein. Such a method may include providing a cable and connecting an illuminated attachment to an end of the cable to add weight thereto. The method further includes routing the cable through a structure such as a raised floor by tossing the illuminated attachment through the structure.

In yet another embodiment of the invention, an apparatus for routing data and power cables under raised floors and through other structures includes an illuminated attachment comprising a socket into which a cable may be plugged. The illuminated attachment adds weight to an end of a cable to aid in tossing it from one location to another. One or more lights are incorporated into a body of the illuminated attachment to allow an individual to more easily see the end of the cable as it is being routed through the structure. In certain embodiments, the lights are energized by simply plugging the cable into the socket.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
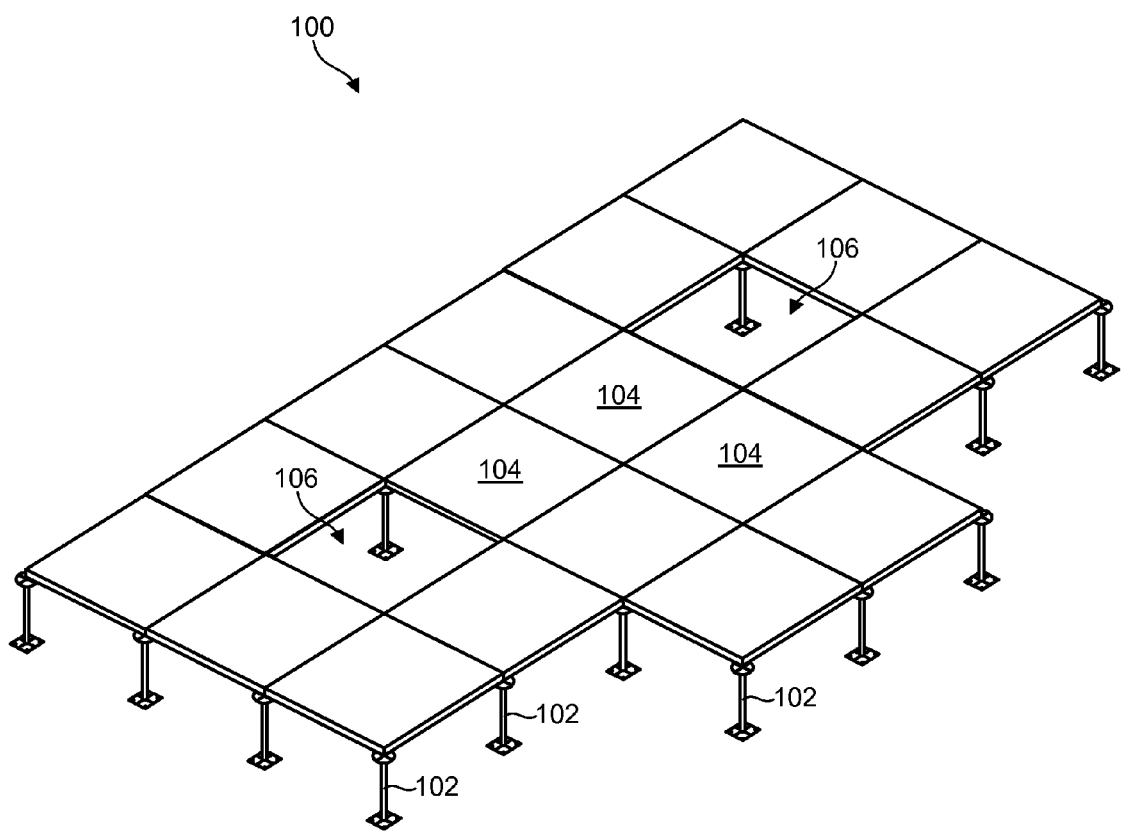
FIG. 1 is a perspective view of one embodiment of a structure, in this example a raised floor, in which an illuminated attachment in accordance with the invention may be used to route cables.

Referring to FIG. 1 one embodiment of a structure 100, in this example a raised floor 100, is illustrated. The raised floor 100 in one type of structure 100 in which an illuminated attachment in accordance with the invention may be used to route cables, such as data or power cables. As previously mentioned, raised floors 100 may be used in buildings such as data centers or equipment rooms to provide means for efficiently routing cables to and from components such as servers, data storage devices, switches, routers, workstations, or the like. As shown, the raised floor 100 comprises a gridded metal framework or understructure supported by adjustable-height legs 102 or pedestals 102. The gridded metal framework provides support for individual floor panels 104 (e.g., square floor panels 104 measuring two feet on each side). The height of the legs/pedestals 102 may be selected based on the number or volume of cables routed under the raised floor 100. Selected floor panels 104 may be removed from the gridded metal framework to route cables or other wiring beneath the raised floor 100.

As previously mentioned, running cables under a raised floor 100 can be difficult when trying to span long distances. The conventional solution is to simply remove selected floor panels 104 and toss the cable beneath the raised floor 100 from one open floor panel 106 to the next. For example, as shown in FIG. 1, one or more cables may be tossed between the open floor panels 106. In selected embodiments, servers or other equipment may be located on the floor panels 104 between the open floor panels 106.

The process of removing floor panels 104 and tossing the cable between open floor panels 106 may be repeated until the cables are routed to a desired location on the raised floor 100. When using this technique, it is easy to lose track of a cable particularly where the cable needs to be routed near existing cables, equipment, or obstacles. Furthermore, a lack of adequate lighting under the raised floor 100 or poor viewing angles can also make it difficult to route cables under the raised floor 100. There is also the danger that connectors on the ends of cables may be damaged when tossing cables between open floor panels 106.

In view of the foregoing problems and limitations, apparatus and methods are needed to more effectively route cables under raised floors 100 as well as under or through other structures. Ideally, such apparatus and methods would enable an individual to more easily see the cable as it being routed under or through such structures, even when other cables, equipment, and/or obstacles are present. Further needed are apparatus and methods to protect the connector on the end of the cable when the cable is being tossed from one open floor panel 106 to the next.

Figure 2A:
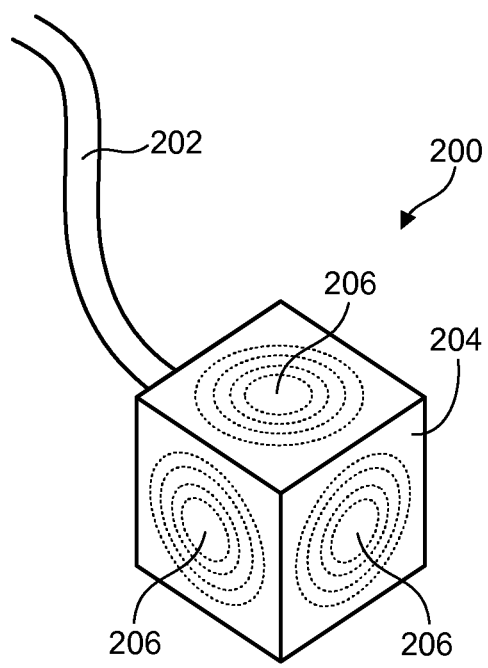
FIG. 2A is a perspective view of one embodiment of an illuminated attachment in accordance with the invention.

Referring to FIG. 2A, one embodiment of an illuminated attachment 200 in accordance with the invention is illustrated. The illuminated attachment 200 may address many of the problems and limitations previously discussed. As shown, the illuminated attachment 200 is placed on the end of a cable 202 to aid in tossing the cable 202 from one open floor panel 106 to the next. In certain embodiments, the illuminated attachment 200 is fabricated from or coated with an elastomeric material such as a natural or synthetic rubber. This will protect the end of the cable 202 from damage as well as protect other objects or equipment that may be present beneath the raised floor 100. In selected embodiments, a weight (not shown) is placed at or near the front 204 of the illuminated attachment 200 to aid in tossing the cable 202. This weight may be embedded in the body of the illuminated attachment 200, attached to the front 204 of the illuminated attachment 200, or the like. In certain embodiments, most of the volume of the elastomeric material used to fabricate the illuminated attachment 200 may be placed at or near the front 204 of the illuminated attachment 200 to add weight thereto.

In selected embodiments, one or more lights 206, such as light-emitting diodes (LEDs) 206, may be incorporated into the illuminated attachment 200 to help an individual more easily see the end of the cable 202 as it is being routed under a raised floor 100 or through a structure 100 such as a conduit, channel, wall, ceiling, crawl space, or the like. These lights 206 may be attached to the illuminated attachment 200, embedded within the illuminated attachment 200, or the like. In the event the lights 206 are embedded within the illuminated attachment 200, the illuminated attachment 200 may be fabricated from a transparent or translucent material to allow light to pass therethrough.

In certain embodiments, the lights 206 may be manually energized by a user, energized in response to motion, or energized in response to plugging a cable 202 into the illuminated attachment 200, as will be explained in more detail hereafter. In selected embodiments, the illuminated attachment 200 contains a battery (not shown) to power the lights 206. In other embodiments, the lights 206 are energized by electrical power supplied through the cable 202. In yet other embodiments, the cable 202 conveys light to the illuminated attachment 200 to power the lights 206. For example, if the cable 202 is a fiber optic cable 202, the fiber optic cable 202 may convey light to one or more lighting elements 206 (which may be as simple as the ends of one or more optical fibers). The light may then be dispersed through the lighting elements 206.

In selected embodiments, the illuminated attachment 200 may be fabricated from or coated with a glow-in-the-dark material. This will allow the illuminated attachment 200 to be visible even when batteries are dead or no power or light is supplied to the illuminated attachment 200. Thus, in certain embodiments, the illuminated attachment 200 may be illuminated in several different ways.

Figure 2B:
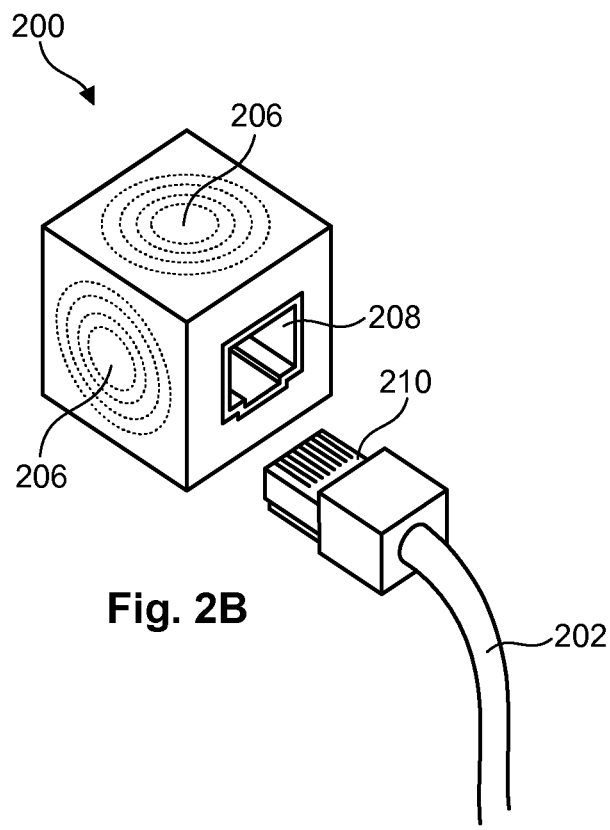
FIG. 2B shows the illuminated attachment of FIG. 2A from another perspective.

Referring to FIG. 2B, the illuminated attachment 200 of FIG. 2A is shown from another angle. As shown, in selected embodiments, a socket 208 may be incorporated into the illuminated attachment 200 to allow a connector 210 to be plugged into the socket 208. This socket 208 may be roughly the same or similar to a port or other device into which the cable 202 is designed to be plugged. This provides a quick and easy way to connect the illuminated attachment 200 to the cable 202. This may also protect the connector 210 when the end of the cable 202 is tossed under a raised floor 100 or through another structure. Such a configuration also allows the cable 202 to convey power and/or light to the illuminated attachment 200 to energize the lighting elements 206. As previously mentioned, in selected embodiments, the lights 206 may be energized upon plugging the connector 210 into the socket 208.

The illuminated attachment 200 shown in FIGS. 2A and 2B is presented only by way of example and not limitation. The illuminated attachment 200 may take on many different forms without departing from the principles and characteristics taught herein. For example, instead of having the illustrated cubic shape, the illuminated attachment 200 may be designed in a cylindrical, spherical, or other suitable shape. Similarly, the shape and size of the socket 208 may be modified to accommodate connectors 210 of various different types. In certain cases an adapter may be provided so that the illuminated attachment 200 is compatible with various different connector types. These represent just a few ways in which the illuminated attachment 200 may be modified and do not represent an exhaustive list.

Figure 3A:
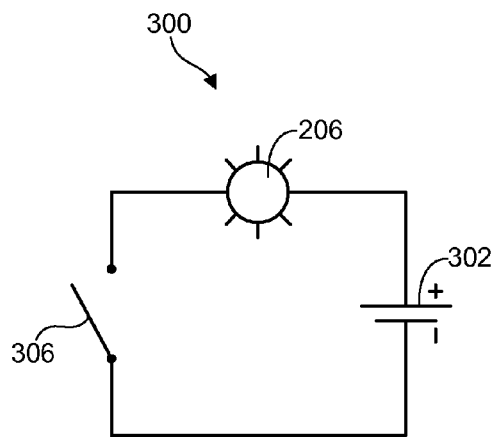
FIG. 3A is a high-level block diagram showing one embodiment of a circuit that may be incorporated into an illuminated attachment in accordance with the invention.

Referring to FIG. 3A, one embodiment of a circuit 300 for use with an illuminated attachment 200 in accordance with the invention is illustrated. As shown, the circuit 300 includes a battery 302, one or more lights 206 (e.g., LEDs) and a switch 306. The lights 206 are turned on and off by closing and opening the switch 306 respectively. The switch 306 may be actuated manually, such as by opening and closing the switch 306 with a finger (such as by clicking a button or flipping a toggle switch), or by unplugging or plugging a connector 210 into the socket 208. Using a connector 210 to actuate the switch 306 may increase battery life by reducing the chance that the lights 206 will be left on, since the connector 210 will almost always be removed from the socket 208 once the cable 202 is successfully routed.

Figure 3B:
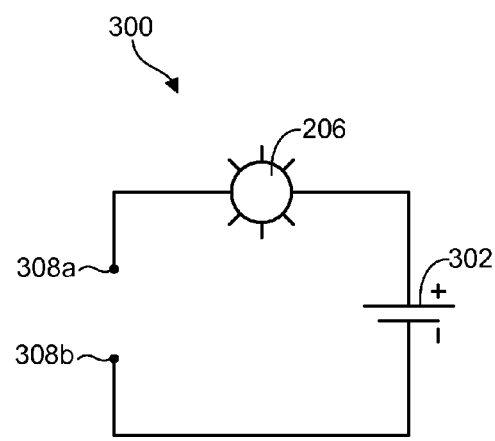
FIG. 3B is a high-level block diagram showing another embodiment of a circuit that may be incorporated into an illuminated attachment in accordance with the invention.

Referring to FIG. 3B, another embodiment of a circuit 300 is illustrated. In this embodiment, the lights 206 are energized by creating an electrical link between two terminals 308a, 308b. This may be accomplished, for example, using a pin on the connector 210. For example, upon plugging a connector 210 into the socket 208, a pin on the connector 210 may bridge the gap between the terminals 308a, 308b, thereby energizing the lights 206. Similarly, removing the connector 210 from the socket 208 may remove the electrical link between the terminals 308a, 308b, thereby turning off the lights 206.

Figure 3C:
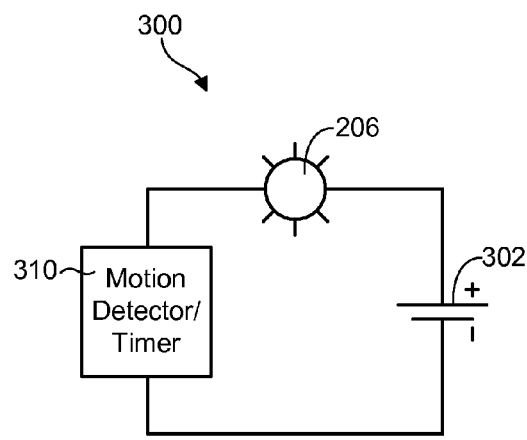
FIG. 3C is a high-level block diagram showing yet another embodiment of a circuit that may be incorporated into an illuminated attachment in accordance with the invention.

Referring to FIG. 3C, yet another embodiment of a circuit 300 is illustrated. In this embodiment, the circuit 300 uses a motion detector 310 and timer 310 to energize the lights 206. For example, upon moving the illuminated attachment 200 (such as would occur by picking up or tossing the illuminated attachment 200), the motion detector 310 may sense the movement and create an electrical connection between the lights 206 and the battery 302, thereby energizing the lights 206. The timer 310 may control how long the lights 206 stay energized after the motion ceases. For example, the timer 310 may keep the lights 206 energized for several seconds to several minutes after the motion has ceased. This may keep the lights 206 energized for some specified time after the illuminated attachment 200 has been tossed to provide time for the end of the cable 202 to be retrieved. The motion detector 310 and timer 310 may increase battery life by ensuring that the lights 206 are not inadvertently left on.

Figure 4:
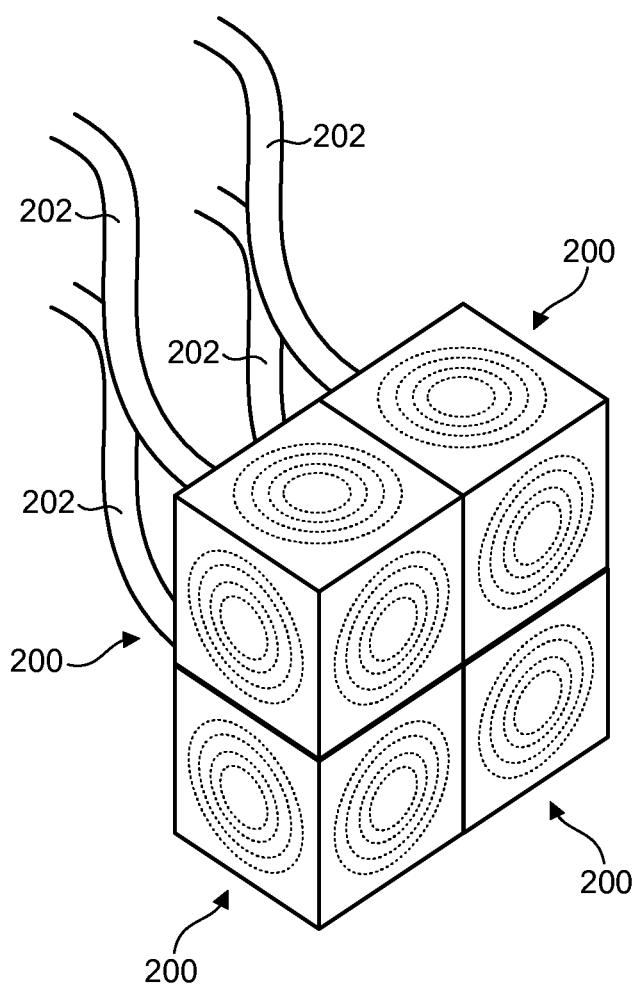
FIG. 4 is a perspective view of several illuminated attachments connected to one another.

Referring to FIG. 4, in selected embodiments in accordance with the invention, an illuminated attachment 200 may include an attachment mechanism to enable one or more illuminated attachments 200 to be connected to one another. The attachment mechanism may include clips, clasps, snapping mechanisms, latches, or other fasteners (not shown), the likes of which are well known in the art. Such attachment mechanisms may enable the ends of several cables 202 to be connected to one another and tossed under a raised floor 100 or other structure together. This may save time, prevent tangling, and allow the cables 202 to follow the same route.

Figure 5:
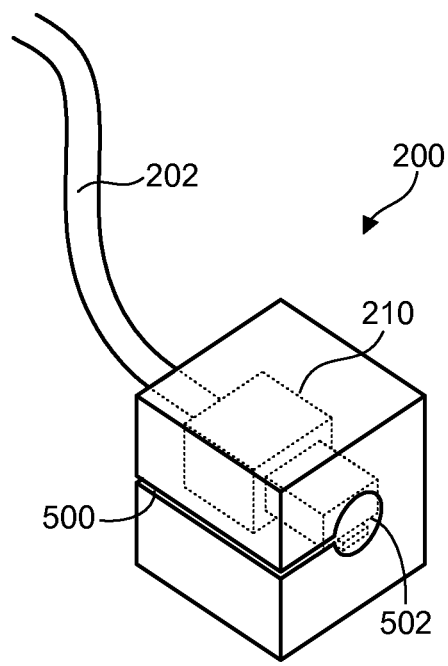
FIG. 5 is a perspective view of an alternative embodiment of an illuminated attachment that grips a connector on the end of a cable.

Referring to FIG. 5, an alternative embodiment of an illuminated attachment 200 is illustrated. The lights 206 are not shown (although they are present) so that certain features of this embodiment of the invention are not obscured. In this embodiment, the illuminated attachment 200 is configured to grip the end of a cable 202, such as grip the connector 210 attached to the end of the cable 202. This may allow the illuminated attachment 200 to be used with various different connector types, as opposed to just a single connector type, thereby providing a more "universal" illuminated attachment 200. In this embodiment, the illuminated attachment 200 is fabricated from an elastomeric material. A slit 500 and internal opening 502 or void 502 may allow the illuminated attachment 200 to fit over various different connector types. If desired, a clip, strap, or clamp (not shown) may be used with the illuminated attachment 200 to keep it more firmly attached to the connector 210. Once a cable 202 is routed, the clip, strap, or clamp may be released to allow the illuminated attachment 200 to be removed from the connector 210.

Figure 6:
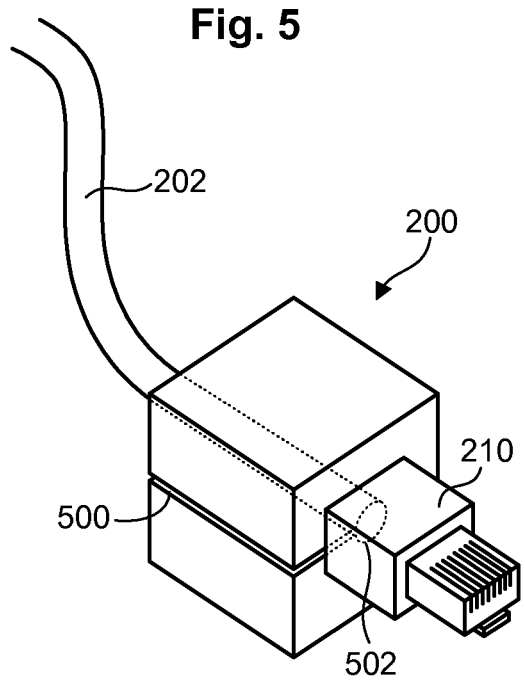
FIG. 6 is a perspective view of an alternative embodiment of an illuminated attachment that grips the cable immediately behind the connector.

Referring to FIG. 6, yet another alternative embodiment of an illuminated attachment 200 is illustrated. Like the previous example, the lights 206 are not shown so that certain features of the embodiment are not obscured. In this embodiment, the illuminated attachment 200 is configured to grip the cable 202 immediately behind the connector 210. This configuration may allow the illuminated attachment 200 to be universally attached to various types of cables 202. Like the previous embodiment, the illuminated attachment 200 may be fabricated from an elastomeric material. A slit 500 and internal opening 502 or void 502 may allow the illuminated attachment 200 to be placed over various types and sizes of cables 202. A clip, strap, or clamp (not shown) may be used to keep the illuminated attachment 200 firmly attached to the cable 202.

The apparatus and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for routing data or power cables, the method comprising:
   providing a cable having a connector on an end thereof;
   providing an illuminated attachment comprising a body that is one of made of and covered by a rubber-like elastomeric material, a socket incorporated into the body and configured to receive the connector, and lights and a power source incorporated into the body to emanate light external to the body;
   plugging the connector into the socket to add inertial mass to the end of the cable and provide a light source proximate thereto; and
   tossing the illuminated attachment through a structure to route the cable therethrough.

2. The method of claim 1, wherein the lights comprise at least one of LEDs and fiber-optic-energized lighting.

3. The method of claim 1, wherein the socket has a same shape and configuration as a port into which the connector at the end of the cable is plugged.

4. The method of claim 1, wherein plugging the connector into the socket energizes the lights.

5. The method of claim 1, further comprising energizing the lights in response to sensing motion of the illuminated attachment, while disregarding the motion of objects external to the illuminated attachment.

6. The method of claim 1, wherein the cable is one of a data cable and a power cable.

7. The method of claim 1, wherein the body is made of one of a translucent and a transparent material to enable light to pass therethrough.

8. The method of claim 1, further comprising lighting the illuminated attachment with a glow-in-the-dark material.

9. The method of claim 1, further comprising connecting the illuminated attachment to other illuminated attachments.

* * * * *